A. W. GAST.
PROCESS AND APPARATUS FOR MAKING GLASS PLATE LETTERS.
APPLICATION FILED FEB. 23, 1918.
1,308,408.
Patented July 1, 1919.
5 SHEETS—SHEET 2.
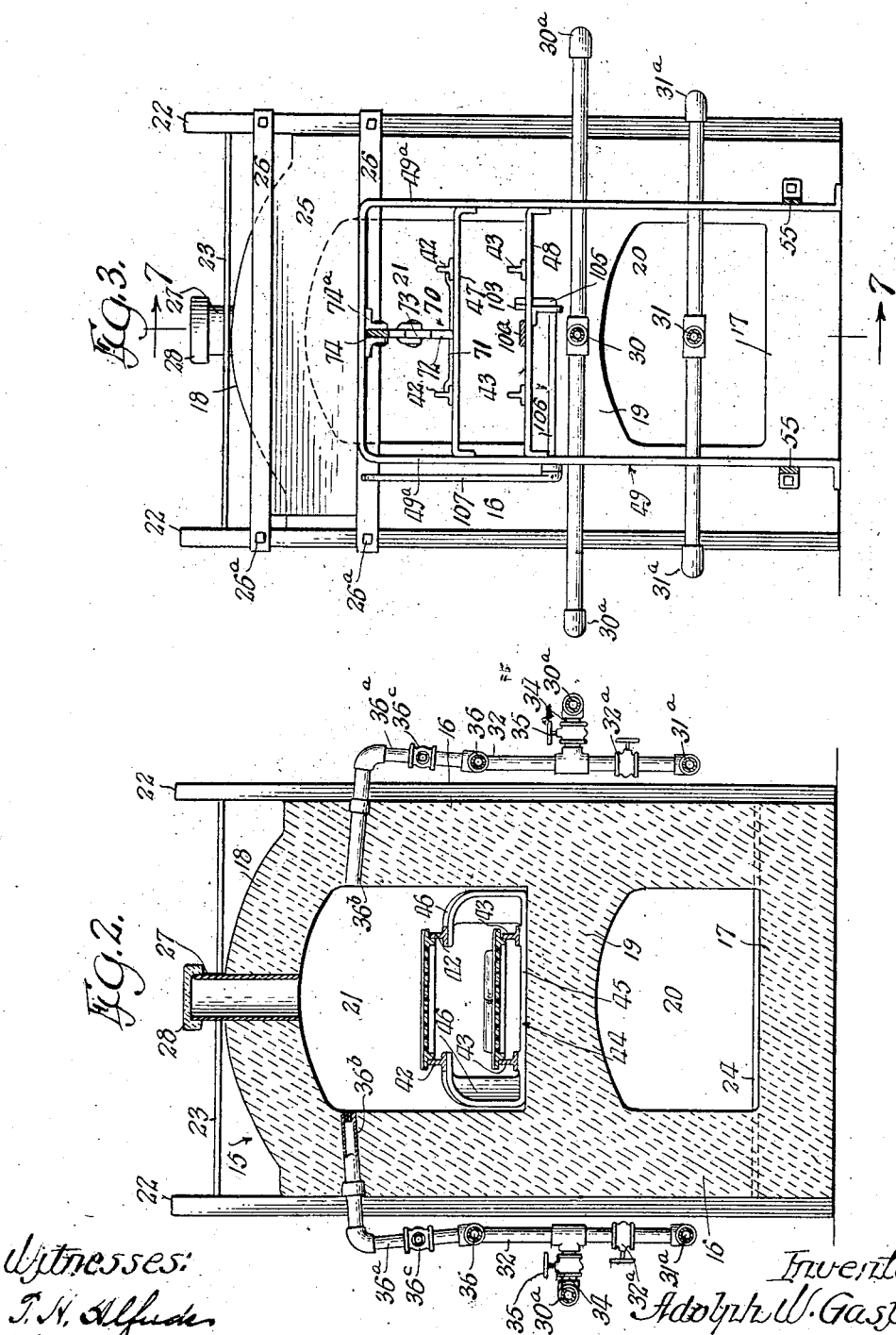

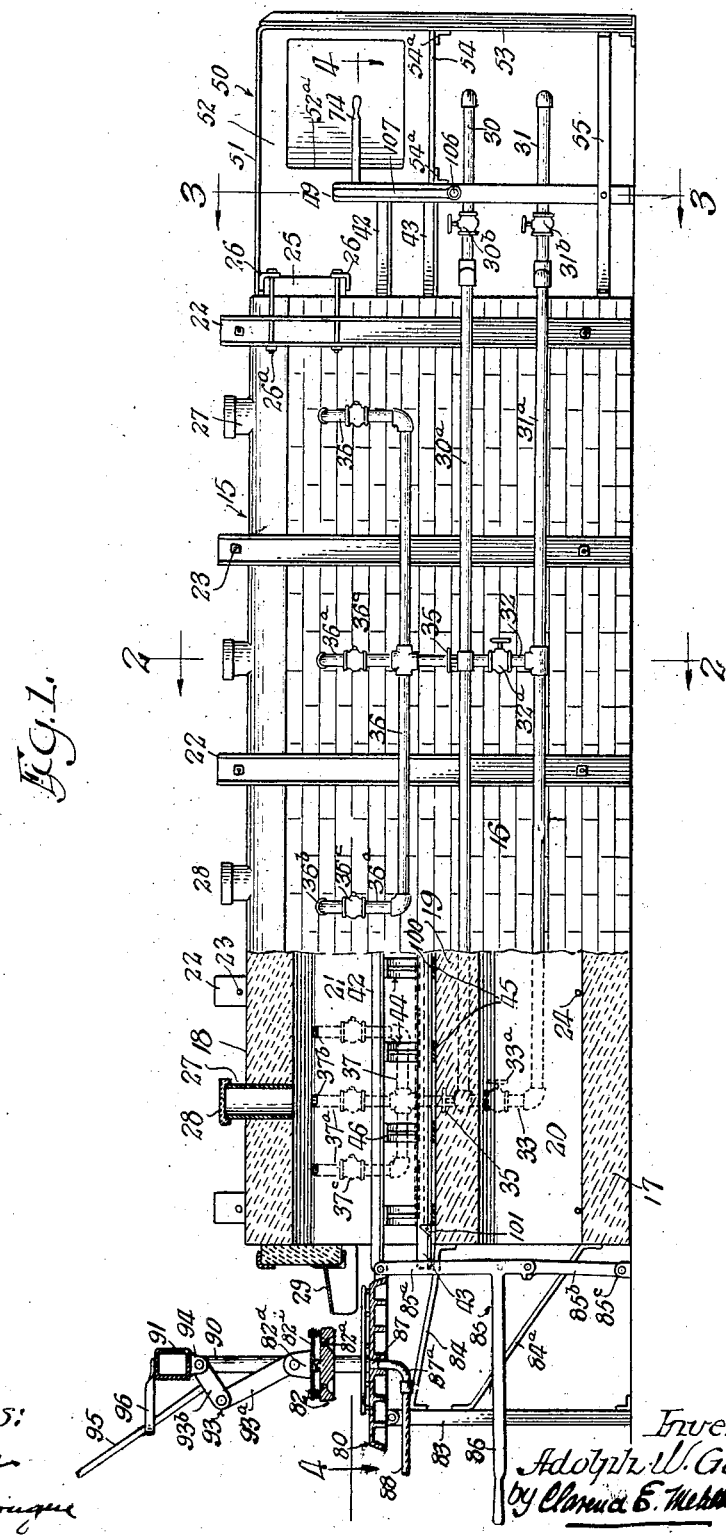

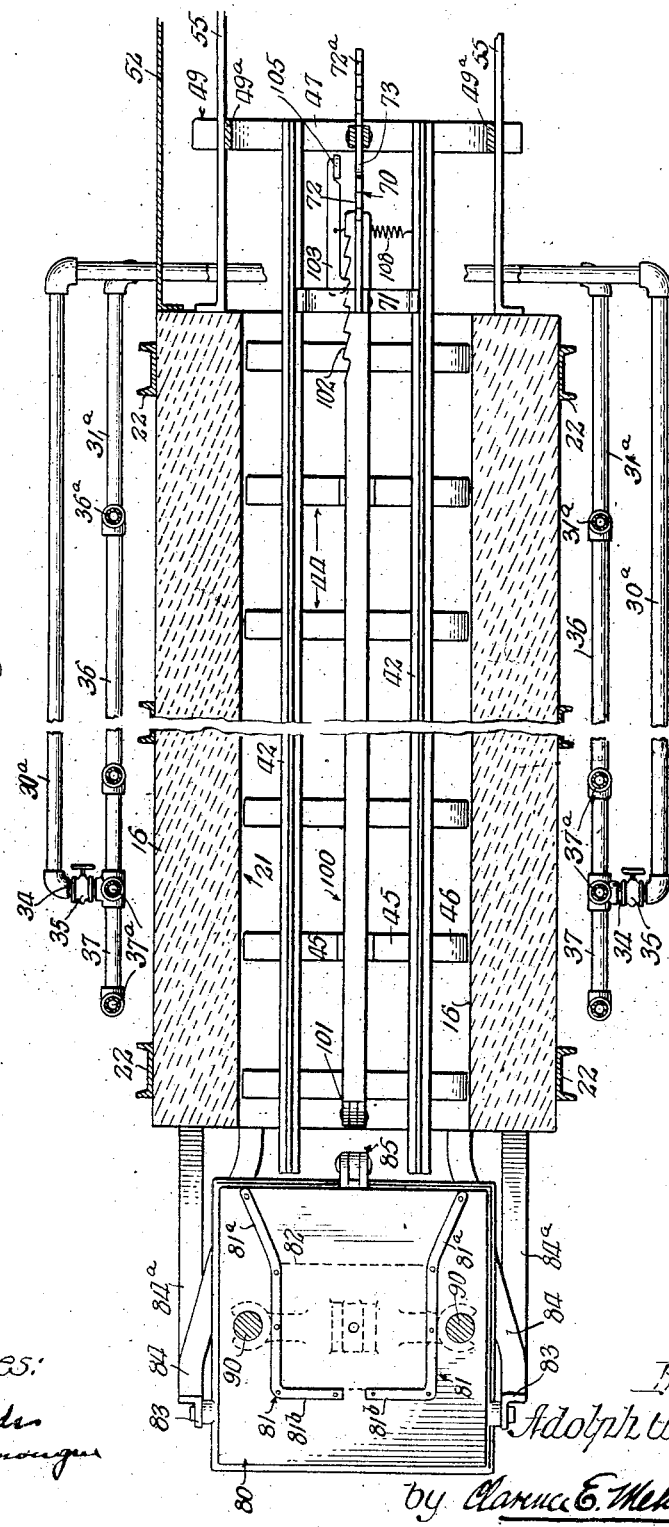

A. W. GAST.
PROCESS AND APPARATUS FOR MAKING GLASS PLATE LETTERS.
APPLICATION FILED FEB. 23, 1918.
1,308,408.
Patented July 1, 1919.
5 SHEETS—SHEET 4.
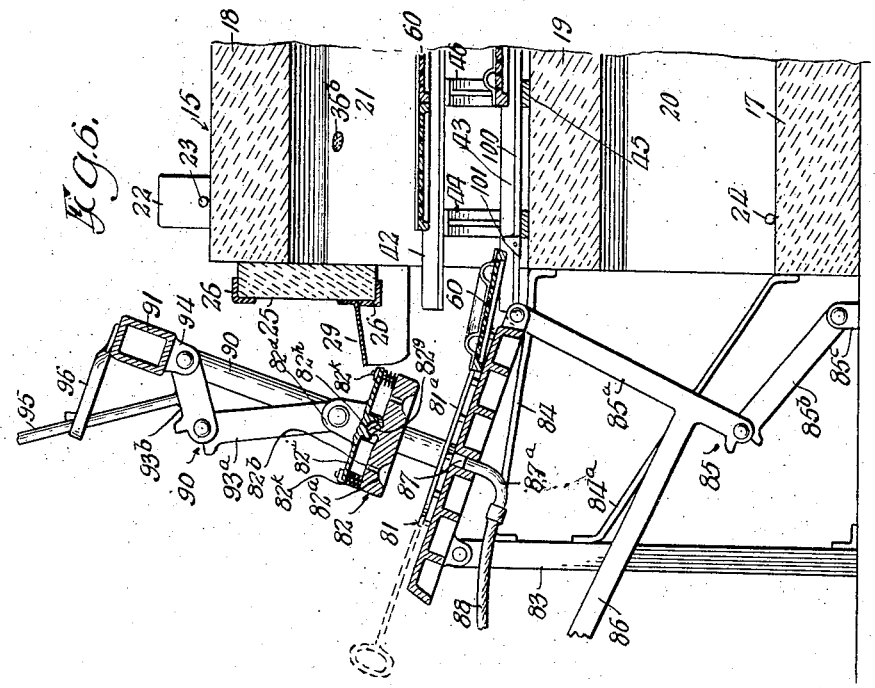
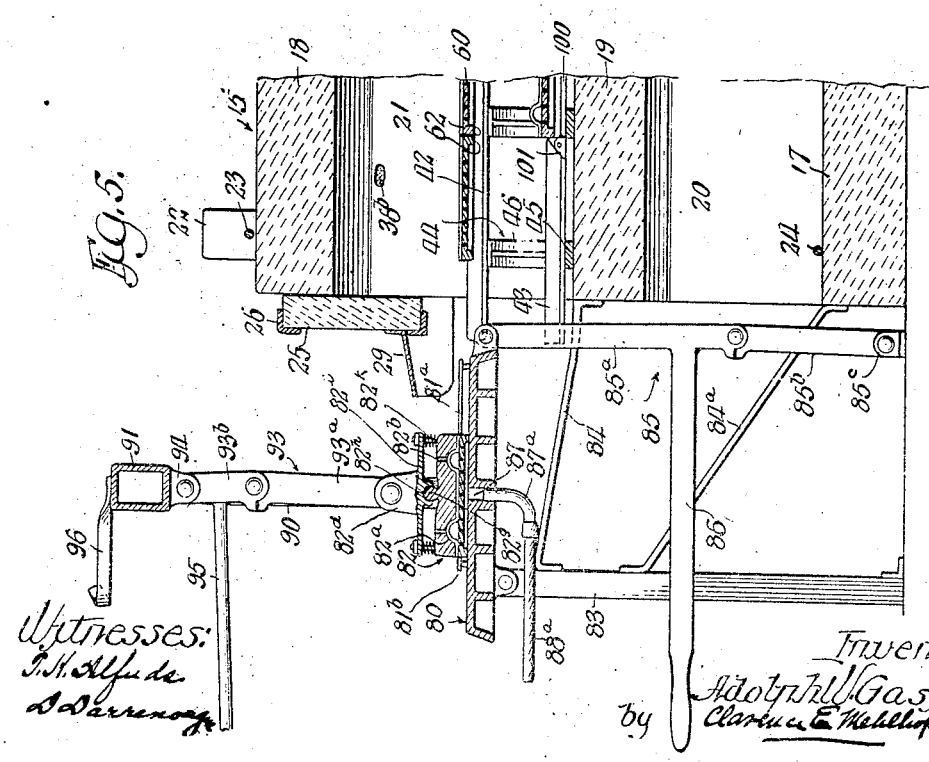

A. W. GAST.
PROCESS AND APPARATUS FOR MAKING GLASS PLATE LETTERS.
APPLICATION FILED FEB. 23, 1918.
1,308,408.
Patented July 1, 1919.
5 SHEETS—SHEET 5.
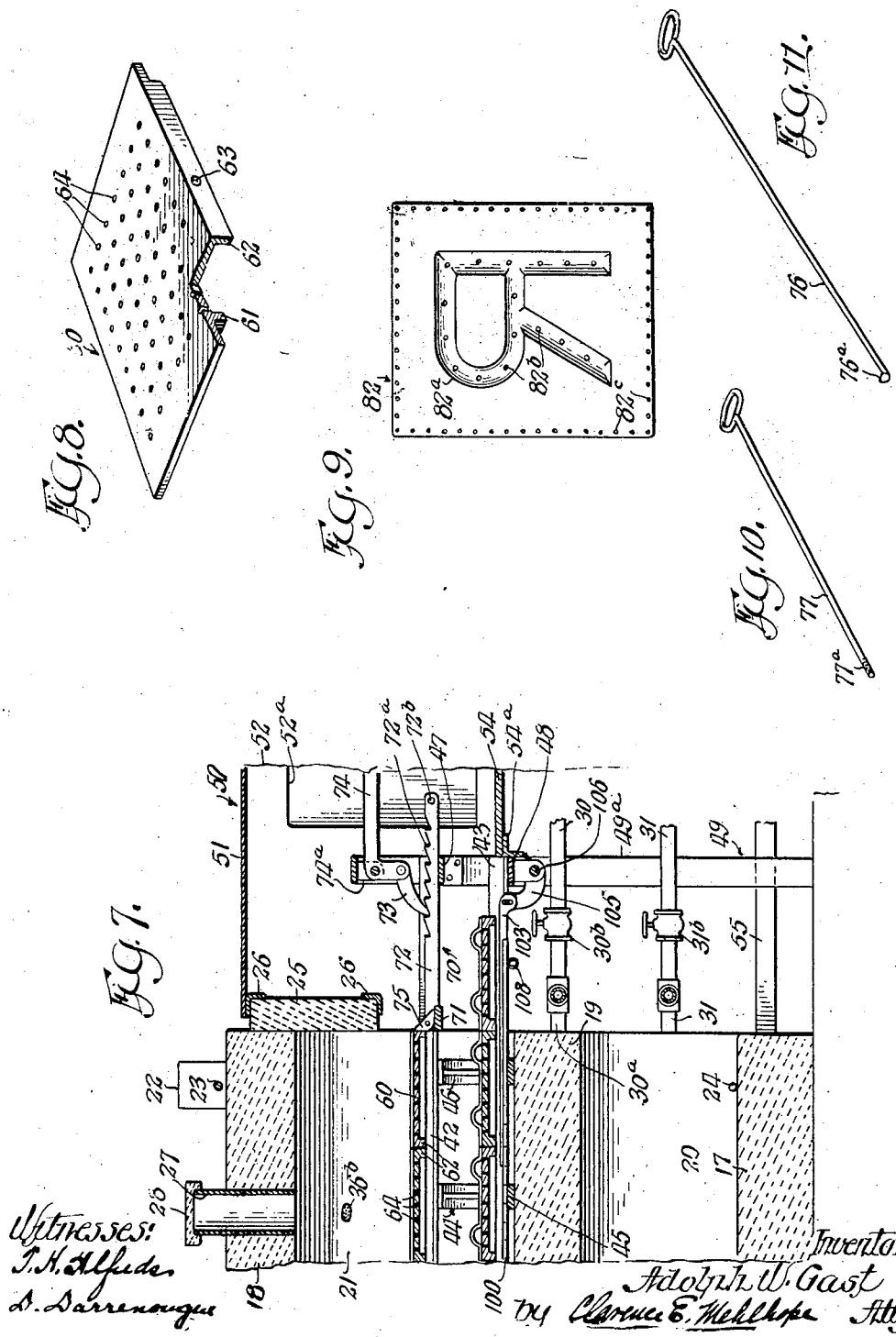

UNITED STATES PATENT OFFICE.

ADOLPH W. GAST, OF CHICAGO, ILLINOIS, ASSIGNOR TO CHICAGO MINIATURE LAMP WORKS, OF CHICAGO, ILLINOIS, A CORPORATION OF ILLINOIS.

PROCESS AND APPARATUS FOR MAKING GLASS-PLATE LETTERS.

1,308,408.  Specification of Letters Patent.  Patented July 1, 1919.

Application filed February 23, 1918. Serial No. 218,625.

*To all whom it may concern:*

Be it known that I, ADOLPH W. GAST, a citizen of the United States, and a resident of Chicago, in the county of Cook and State of Illinois, have invented certain new and useful Improvements in Processes and Apparatus for Making Glass-Plate Letters; and I do hereby declare that the following is a full, clear, and exact description thereof, reference being had to the accompanying drawings, and to the letters of reference marked thereon, which form a part of this specification.

This invention relates to an improved process for making glass letter plates, and to an apparatus for carrying out said process, and consists of the matters hereinafter described and more particularly pointed out in the appended claims.

The letter plate to be made consists of a glass plate of substantially uniform thickness throughout, with a letter design, character or other device appearing in relief on the one side, namely the face side of the plate, and with a corresponding depression on the reverse side of the plate. Such type of letter plate is well known in the art.

The object of the invention is to provide a novel process and an apparatus for carrying out the same, in which and by which the letter plates may be quickly and readily made and may be finally produced as finished products in a cheap and economical manner, and with a minimum of loss of the glass plate blanks from which they are made.

In carrying out the process, a glass plate blank of the dimensions and form to contain the desired letter, design, character or other device within its outline with a marginal space about the letter or design, is preliminarily heated to say, 500° F. Said blank is then placed, face up, on a perforated supporting plate of substantially the same plan area as that of the glass blank. The two are then subjected to successively increasing degrees of heat, the application of heat being continued until the glass plate becomes soft and pliable and capable of being affected by pressure against a die.

For carrying out this step of the process, I provide a long furnace, in which are maintained a plurality of zones of successively increasing degrees of heat. A number of perforated supporting plates are preferably provided so that the process may be carried on as a continuous process. The glass blanks, supported face up on their respective perforated plates, are slowly advanced through the furnace, being introduced at the end at which the lowest temperature maintains and being thence passed slowly through the successive zones of increasing temperatures, until finally they are ready to be removed, one at a time, from the hottest end of the furnace, to be subjected to the letter forming part of the process. The temperature at the inlet end of the furnace should be not less and preferably a little greater than that to which the blanks are preliminarily heated.

A temperature of about 1400° F. is sufficient for the hotter end of the furnace.

The glass plates are made to advance in succession through the furnace and through the several successive and increasingly hotter zones of heat in the furnace, at such a rate of speed that when a blank on its supporting plate reaches the discharge or outlet end of the furnace, the blank will have been raised to such a temperature that it may be treated under pressure in a die. Of course, to those familiar with the art, the color of the glass blank will indicate when it has been heated to the required degree and the rapidity of the feed of the blanks through the furnace, may be gaged accordingly by experiment.

The several blanks, after they are heated as described, and brought to the proper condition, are in succession treated under high pneumatic pressure against a hot die containing in intaglio on its bottom face, the letter, character or device to be formed on the glass blank. The die is brought down by manual or other pressure against the top face of the blank and is provided with suitable devices at its margins to grip and seal the blank between it and the perforated supporting plate. The die should be kept at substantially the temperature maintained at the hotter end of the furnace so that there will be no chilling of the glass blank when it is brought face up into contact with said die. A high degree of pneumatic pressure is provided (preferably about 85 pounds) and this pressure is brought to bear against the bottom face of the blank through the perforations of the plate upon which it is supported,—the die having first been brought forcibly into sealing engagement with the marginal parts of the blank.

By using an excess of pressure, the complete and perfect outline of the letter, character or other device, corresponding to the intaglio in the die, is produced, and the possibility of any sagging or lack of conformity of the deformed part of the blank with the intaglio of the die, is prevented. In addition, the escape of the pneumatic fluid and loss of pressure due to the impossibility of providing absolute air tight connections in a continuous process, where the supporting plate upon which the blank is carried through the furnace, provides the outlet for the escape of the pressure, is compensated for so that the required high pressure to properly form the letter, may still be maintained and brought about in the formation of each blank.

After the blank has been subjected, by means of the pneumatic fluid, to pressure against the die and the letter or character has been thus formed, the die is raised from the blank. This leaves the formed letter plate face up on the perforated supporting plate. By means of the pneumatic pressure, again exerted immediately after the die has been raised, the blank is dislodged or slightly raised from the perforated supporting plate, thus breaking any connection that may have been formed between the two due to the pressure against the die.

The formed glass blank on its supporting plate, is then removed from its position below the die and is gradually cooled. This is done, preferably, by subjecting it in reverse order to the zones of temperature by which it has been theretofore raised to its high temperature, until it is cooled to a temperature substantially such as that maintained in the inlet end of the furnace. It is then in condition to be removed from its supporting plate and may be placed in an annealing oven wherein it is finally brought to the temperature of the atmosphere, which finishes the production of the plate. A new glass blank, preliminarily heated as above described, is placed upon the perforated supporting plate from which the formed plate has been removed, and the process is started again for this new blank and is carried on as before.

In order to illustrate the process more clearly, reference is had to the accompanying drawings, which show a novel and improved apparatus for carrying out the process.

In the drawings:

Figure 1 is a view, partly in side elevation and partly in longitudinal section, illustrating my apparatus for forming raised letters on glass plates.

Fig. 2 is a transverse, sectional view on an enlarged scale, through the improved apparatus, the plane of the section being indicated by the line 2—2 of Fig. 1.

Fig. 3 represents a transverse, sectional, end view of the apparatus, the plane of the section being indicated by the line 3—3 of Fig. 1.

Fig. 4 illustrates a horizontal, plan, sectional view through the apparatus, the plane of the section being indicated by the line 4—4 of Fig. 1.

Fig. 5 represents a detail, longitudinal, vertical, sectional view on an enlarged scale, through that part of the apparatus shown in the left hand end of Fig. 1, but with the parts in a changed relation therefrom.

Fig. 6 is a view similar to that shown in Fig. 5, but with the parts shown in a still further changed relation.

Fig. 7 is a vertical, detail, sectional view of the loading and unloading end of the apparatus shown in the right hand end of Fig. 1.

Fig. 8 is a perspective view of a glass plate-supporting carriage, a part of which is shown as broken away to more clearly illustrate the construction thereof.

Fig. 9 is a bottom plan view of one of a plurality of die-plates used in connection with my apparatus.

Figs. 10 and 11 are perspective views of bars or tools used by the workmen in the operation of the apparatus.

Referring now in detail to the construction of the apparatus shown in the accompanying drawings:— 15 indicates as a whole, an elongated furnace body forming a part of my improved apparatus. This furnace body is preferably made of brick and has upright side walls 16, a flat bottom wall 17, a transversely arched, top wall 18, and a longitudinally extending, intermediate wall 19, which divides the furnace body into a bottom flue 20 and a top heating compartment or chamber 21. The flue 20 and the compartment or chamber 21 extend the full length of the furnace body.

The furnace body is suitably braced by means of upright channel bars 22, placed at regular intervals along the sides of the furnace body and these upright bars are connected together by top and bottom, transverse stay-bolts 23, 24. 25, 25 indicate fire proof slabs or aprons which partially close the ends of the chamber 21 at the top and prevent the too rapid escape of heat from the interior of the chamber 21. These slabs 25 are suitably held in place by angle bars 26, which are attached by bolts 26ª to the endmost upright channel bars 22 before mentioned. In the arched top wall 18 of the furnace body, are stacks 27, which are closed by removable cap pieces 28. At one end of the furnace body, as shown in this instance, at the left hand end, is a heat deflecting hood 29. The purposes of the stacks 27 and of the hood 29 will appear later.

The chamber 21 is heated in the following manner: 30 (see Figs. 1 and 3) indicates a fuel gas supply pipe that has branch pipes 30$^a$ arranged on each side of the furnace body and extending substantially throughout the length thereof (see Fig. 4). A shut-off valve 30$^b$ is provided in the pipe 30. 31 indicates an air pressure supply pipe having branch pipes 31$^a$ arranged on each side of the furnace body in a plane below the branch pipes 30$^a$ of the fuel gas supply pipe 30. A shut-off valve 31$^b$ is provided in the pipe 31. 32, 33 indicate upright pipes arranged in pairs on each side of the furnace body, which lead off from the air pressure branch pipes 31$^a$ and which have shut-off valves 32$^a$, 33$^a$. Short, horizontal pipes 34, (see Fig. 2) connect the fuel gas branch pipes 30$^a$ with upright pipes 32, 33 and in these pipes 34, shut-off valves 35 are provided. Each upright pipe 32, 33 has longitudinally extending header pipes 36, 37 from which lead off, burner pipes 36$^a$, 37$^a$ that extend through the upright side walls of the furnace near the top, and terminate in nozzles 36$^b$, 37$^b$. In each burner pipe 36$^a$, 37$^a$ are adjusting valves 36$^c$, 37$^c$ which may be adjusted to control the amount of gas and air under pressure to be supplied to the burner pipes.

It will be noted that the burner pipes 36$^a$ at the right hand end of the furnace, which is the loading and unloading end of the furnace, are more widely separated than are the burner pipes 37$^a$ at the opposite end of the furnace. With this arrangement of the burner pipes and of the various valves before mentioned, the temperature within the chamber 21 may be graduated from the desired low temperature at the loading end of the apparatus, to the predetermined high temperature at the other end of the apparatus, which I shall hereinafter refer to as the "forming" end of the apparatus.

Within the chamber 21 and of a length extending slightly beyond the ends thereof, are top and bottom, spaced rails 42, 43 respectively, which are preferably made of inverted T-bars. These rails are suitably supported within the chamber 21 by means of longitudinally spaced, U-shaped brackets 44 which rest upon the intermediate wall 19. As shown in Fig. 2, each bracket 44 has a transverse base 45 upon which the lower rails 43 are fixed, and upright overhanging arms 46 that support the top rail 42 in alinement with the bottom rails 43. At the loading end of the apparatus, said rails are supported on cross bars 47, 48, (see Fig. 3) that are fixed at their ends to the upright side members 49$^a$ of an inverted U-shaped frame 49 that is spaced a short distance from the loading end of the furnace body proper.

The loading and unloading end of the furnace is inclosed by a sheet metal housing 50 having a top wall 51 and upright side and end walls 52, 53, the housing being open at one side to give access to a table 54 in the housing. In the side wall 52 of the housing is provided a door opening 52$^a$ that gives access to an annealing oven, this door opening being located conveniently with respect to the table 54 which is supported at its front and rear ends upon the angle bars 54$^a$ fixed to the U-shaped frame 49 and the upright end wall 53 of the housing before mentioned. The end wall 53 is braced at its bottom, from the furnace body by bars 55 which are also arranged so as to brace the U-shaped frame 49.

60 (see Fig. 8) indicates one of a plurality of plate carriers, that is to say, carriers upon which the flat plates or panes of glass are placed, to be gradually fed through the chamber 21 from the loading end of the furnace to the forming end of the furnace proper and then back to the said loading and unloading end as will presently appear. Each plate-carrier 60 is somewhat wider than the distance between the rails 42, 43, so that said plates are adapted to rest at their side margins upon the rails 42, 43 in the movement of said carriers through the chamber 21. Each carrier 60 has depending side and end flanges 61, 62 respectively, and in each end flange 62 are formed threaded openings 63. That area of the plate defined by the flanges 61, 62, is perforated as shown at 64.

To introduce a glass plate into the furnace, one of said glass plates which are of the same size as the carrier 60, is withdrawn from the annealing oven where they are preliminarily heated and is placed upon a carrier 60 that is held in readiness upon the table 54. Preferably, to prevent the glass plate from sticking to the carrier, I apply a coating of whiting to the top surface of the carrier. In placing the glass upon the carrier, care is taken to see that the edges of the glass plate coincide with the edges of the carrier. The carrier with the associated glass plate is then placed upon the top rails 42, with the margins of the carrier riding upon the top edges of the said rails. To advance the loaded carrier on the top rails 42 into the furnace, I employ a T-shaped pusher bar 70 (see Fig. 4). The head member 71 of this pusher bar engages and slides upon the rails 42 while the body member 72 of the same, engages and slides upon the cross bar 47 of the U-frame 49. The top edge of this body member has ratchet teeth 72$^a$ engaged by a pawl 73, pivoted to the short arm of a bell crank lever 74 which is operatively suspended from the top of the U-shaped frame by brackets 74$^a$. To the head member 71 is pivoted a pair of triangular shaped dogs 75 which are so formed as to rock rearwardly to permit a carrier plate 60 to pass over it as the carrier is placed on the rails 42, but which act to form a rigid shoulder adapted to engage the rear end of the carrier and advance the same, as movement is imparted to the pusher rod 70 upon actuation of the rocking hand lever 74.

The pusher rod is of such a length as to be capable of moving the carrier 60 inwardly under the action of the rocking lever 74, through the furnace upon the rails, a little more than the length of a carrier, after which the pawl 73 is lifted out of engagement with the teeth 72ª and the pusher rod is withdrawn to its normal position by means of a bar 76 (see Fig. 11) that has a hooked end 76ª which is inserted in a hole 72ᵇ in the pusher bar 72, for that purpose. Another carrier 60 with a glass plate thereon is placed upon the rails 42 and moved forwardly through the furnace by the pusher bar, as heretofore described, the carriers acting to push the adjacent carrier in advance, thus imparting a progressive, continuous movement to all of the carriers upon the said top rails. As the carriers with the glass plates thereon, move toward the opposite or forming end of the furnace, they are gradually raised in temperature as the temperature in the heating compartment 21 is graduated from the loading and unloading end toward the forming end, as before described.

As a carrier and its associated plate of glass approaches the forming end of the furnace, an operator takes a bar 77 (see Fig. 10) that has a threaded end 77ª and screws the same into the threaded opening 63 in the end of the carrier, and withdraws the carrier and its associated glass plate, now properly heated, and delivers them upon a normally horizontal table 80, which is arranged with its top surface in the plane of the bottom edges of the flanges 61 and 62 of the carrier 60. With this arrangement, no jar or jolt is imparted to the carrier to fracture the glass plate thereon in any manner. Guide bars 81 are arranged in the top surface of the table to center the carrier on the table with respect to a die member 82, the purpose of which will hereinafter appear. The side parts 81ª of the rails 81 diverge for the purpose of centering the carrier, while the transverse parts 81ᵇ of the rails are separated to leave room for the use of the handling bars or irons 76 and 77 before referred to.

The table 80 is pivoted near its outer end upon the top ends of upright bars 83 that are suitably braced from the associated end of the furnace by top and bottom brace bars 84, 84ª. The inner end of the table is supported in the horizontal position by an upright toggle bar 85, the top part 85ª of which is pivoted to the inner edge of the table at the middle, while the bottom part 85ᵇ is pivoted between ears 85ᶜ fixed to the floor. A lever 86 is fixed to the top part 85ª of the toggle bar to break the toggle when it is desired to tilt the inner edge of the table for the purpose of transferring the carrier and its associated glass plate to the bottom rails, as shown in Fig. 6, for a purpose soon to appear. When the table is in this tilted position, the inner edge will rest upon the brace bars 84 as shown in Fig. 6. In the center of that area of the table covered by a carrier 60, when the same is upon the table, an opening 87 is provided and connected to this opening is a nipple 87ª that has a hose 88 connected to it, leading from a suitable air pressure tank (not shown).

Arising from the side margins of the table at its middle, are upright standards 90 that are connected at their top ends by a cross head 91. Slidably mounted on these standards, is the die plate 82, before referred to. This die plate has a groove 82ª in its bottom surface which outlines the letter to be produced in the glass plate (see Fig. 9). Small openings 82ᵇ which open through the top of the plate, are provided in the groove 82ª, and around the edges of and on the bottom surface of the die plate are provided small lugs 82ᶜ which, when the die plate is brought into engagement with the glass plate on the carrier, act to partially embed themselves into the edges of the glass plate and prevent any movement of the plate on the carrier during the operation of forming the raised letter upon the glass plate. This die plate has a sphere 82ᵍ on its top surface which engages in a socket 82ʰ in a head plate. 82ʲ. Said die plate and head plate are also connected at their corners by yielding devices 82ᵏ, so that the die plate is capable of a limited floating movement with respect to the head plate, so that said die plate can accommodate itself to any irregularities in its engagement with the carrier plate before referred to. Upon the top surface of the head plate which has lateral parts to engage the upright standard 90, are spaced ears 82ᵈ between which is pivoted the bottom member 93ª of a toggle jointed bar 93, the top member 93ᵇ of which is pivoted between ears 94 depending from the cross head 91 connecting the top ends of the standards together. The said bar member 93ᵇ has an operating lever 95 secured to it, and this lever normally engages a hook 96 on the cross head 91 to hold the die plate in a position above the table 90 as shown in Figs. 1 and 6.

After a carrier 60 and its associated glass plate have been withdrawn from the furnace and centered in position upon the table 80, the operator releases the lever 95 from the hook 96 and depresses said lever to bring the die plate 82 into engagement with the glass plate on the carrier, and also to bring the carrier into a position wherein its flanges 61 are held in a close engagement with the top surface of the table so as to provide a substantially air tight seal between said carrier flanges and said table.

With the parts in this position, air is admitted through the hose 88 and the air pressure thus produced between the table top and the flanged area of the carrier 60 will force that part of the glass plate, beneath and in line with the grooves 82ª of the die plate, up into said grooves, that surface of the glass plate thus displaced conforming to the outline of the letter grooves in the die plate 82. The air through the hose 88 is momentarily shut off and the die plate raised to and held into its elevated position by means of the lever 95, and the hook 96. During the formation or the blowing of the raised letter in the glass plate as just described, the lugs 82ᶜ on the die plate prevent any drawing in of the edges of the glass plate and maintain the edges of the glass plate in straight lines, thus eliminating any necessity for trimming the edges of the finished letter plate. The die plate 82 is maintained at the proper temperature so as not to fracture the glass plate by chilling the same, by the hood 29, which directs such heat as issues from that end of the heating chamber, upon said die.

After the raised letter has thus been formed and the die plate 82 has been elevated to its normal position, air is again admitted through the hose 88 to lift the plate and free it from any tendency to stick to the mold. After this operation has been completed, the operator actuates the lever 86 to break the toggle joint in the bar 85 and thus tilt the table about its pivotal point of attachment with the upright bars 83 until its inner edges rest upon the brace bars 84 before mentioned. During all this time, the tool or iron 77 is still threaded to the carrier 60. The operator at this end of the furnace pushes the carrier with its associated glass plate downwardly and rearwardly toward the furnace, onto the bottom rails 43 in the heating chamber 21, after which the table is brought back into its normal, horizontal position by the lever 86, ready to receive another carrier and associated glass plate from the rails 42 in the manner just described.

The carriers with their associated glass letter plates are moved rearwardly on the rails 43 toward the loading end of the furnace, much in the same manner as they are advanced from said end toward the forming end of said furnace, and the means for imparting such rearward movement to said carriers will now be described.

Resting upon and slidably mounted on the transverse bases 45 of the U-shaped brackets 44, is a puller bar 100 which is of a length approximating that of the furnace. On that end of the said bar adjacent the forming end of the furnace, are provided triangular dogs 101 which are similar to the dogs 75 on the pusher bar 70, but which face in the direction opposite to said dogs 70 and therefore engage the front end of the carrier plate and operate when the puller bar moves toward the loading and unloading end of the furnace, to move said carrier plate toward that end. The puller bar is preferably laid flat instead of edgewise as in the case of the pusher bar 70, and on one edge of the other end of said flatwise puller bar 100 are provided teeth 102 (see Fig. 4) which face in a direction opposite from that of the teeth 72ª on the pusher bar 70. Associated with said puller bar is an elongated pawl 103, which normally engages with one of said teeth 102. This pawl 103 is pivotally connected to the top end of an L-shaped arm 105 that is fixed to a rock shaft 106, which is journaled in a suitable manner in the U-shaped frame 49. A lever 107 is fixed to one end of the rock shaft 106 for the purpose of rocking said shaft, and a spring 108 fixed at one end to the one of the rails 43, and at its other end to the pawl 103, normally holds the pawl in operative engagement with the teeth on the puller bar. When a rocking movement is imparted to the lever 107, a step by step, rearward movement is imparted to the puller bar 100 through the L-shaped arm 105 and pawl 103. As the puller bar moves rearwardly, it will, through the engagement of its dogs 101 with the front end of the carriers, move the same rearwardly and when the end of the limit of this movement is reached, it is pushed forwardly manually into its normal position, ready to pick up another carrier as it is fed onto the bottom rails from the table 80 as before described. Should there be a carrier on the rails 43 at the forming end of the furnace, the dogs 101 tilt and click past said plate into a position to move the said plate rearwardly as movement is imparted to the puller bar.

As the carriers increase in number upon the rails 43, the frontmost carriers move those in the rear, rearwardly where they are taken off the rails 43 in turn upon the table 54, where the finished glass plates are removed from the carriers with thin peels or paddles, after which they are passed through the doorway 52ª into the annealing oven, and gradually cooled down, when they are ready for use. The empty carriers are now ready to receive other glass plates, to be treated as before.

It will be noticed that the glass plate and carrier are placed upon the rails 42 at the cooler end of the furnace, after which the glass plates are gradually raised in temperature as they are advanced toward the forming end of the apparatus, which of course, is of such high temperature as to bring the glass plate into the proper pliable condition. After the raised letter has been blown in said plate as described, it is returned to the furnace where it is initially re-subjected to the higher temperature, and then is gradually moved again into the cooler temperature so that fracture of the glass plates due to too rapid cooling, is prevented. The heat of the furnace throughout its length is determined through the aid of thermometers (not shown) and this heat may be regulated by means of the valves in the gas fuel supply, and air pressure supply pipes before mentioned. Should any part of the furnace become too heated, it may be relieved by removing the caps 28 from one or more of the stacks 27, before mentioned.

With the aid of my improved apparatus, raised letters may be formed in glass plates, in a continuous manner, thereby increasing the output of such letter plates, with the resulting lower cost of manufacture. As the glass plates in their pliable state, are not actually worked by hand and consequently untouched by tools and the like, there is less breakage and waste of heated glass.

I claim as my invention:—

1. The process of making glass letter plates which consists in heating a glass plate of a size required to contain the letter within its outline, the heat being applied in such manner as to evenly and equally heat the plate throughout, and being continued until the glass of the plate becomes pliable and capable of being affected by pressure against a die, of then subjecting the glass plate to pneumatic pressure exerted from below the glass plate against a die engaged against the top of the glass plate and containing a depression or depressions defining the outline of the letter to be produced, said pressure being substantially in excess of atmospheric pressure as described, and of then annealing the glass letter plate with the formed letter faced upwardly as it is left after the operation of the die.

2. The process of making glass letter plates which consists in heating a glass plate together with a perforated supporting plate upon which it rests, the heat being applied until the glass plate becomes pliable and workable under pressure against a die, of then subjecting the glass plate to pneumatic pressure substantially in excess of atmospheric pressure as described, said pressure being exerted upwardly through the perforations of the said supporting plate against a die, said die having depressions outlining and defining the letter to be produced, of producing a relative vertical movement between the die and the supporting plate to remove the glass plate from the die, and of then subjecting the glass letter plate to the process of annealing, in a position with the letter faced upwardly as when the glass plate is removed from the die.

3. The process of making glass letter plates which consists in heating each glass plate together with a perforated supporting plate upon which it rests, the heat being applied at progressively increasing temperatures until the glass plate becomes pliable and workable under pressure against a die, of then subjecting the glass plate to pneumatic pressure exerted upwardly through the perforations of the plate upon which it is supported, against a die placed above, that has been separately heated to a temperature approximating but not exceeding that of the glass plate, said die having depressions outlining and defining the letter to be produced, of then producing a relative vertical movement between the die and the supporting plate to remove the glass plate from the die, and of then subjecting the glass plate while still on its supporting plate, to successively decreasing temperatures.

4. The process of making glass letter plates which consists in heating glass plates together with perforated supporting plates, a glass plate resting on each supporting plate, by advancing them through a furnace in which they are subjected to zones of heat of progressively increasing temperatures, the rate of advance being such that each glass plate is gradually and finally heated to a condition in which it is pliable and workable against a die, of then subjecting the glass plates in succession to pneumatic pressure exerted upwardly through the perforations in the plates upon which they are supported, against a die that has been independently heated to a temperature approximating but not exceeding the temperature of the glass plates, of then dislodging each glass plate from its supporting plate to break any bond that may have been formed between the two under the action of the pressure against the die, and of then subjecting the glass letter plates to the process of annealing, with the formed letter uppermost as when the plate is removed from the die.

5. The process of making glass letter plates which consists in heating a furnace chamber to progressively increasing temperatures from one end to the other thereof, of moving a glass plate with a flat perforated supporting plate upon which it rests, through said furnace chamber from the cooler to the hotter end thereof, toward a die located outside and beyond said hotter end of the furnace chamber, so that said glass plate and its flat supporting plate are subjected to progressively increasing temperatures during their passage through said furnace chamber from said cooler end toward said hotter end, where such heat is maintained as to make the glass pliable and workable under pressure against a die, of then subjecting the glass plate while pliable and workable to pneumatic pressure exerted upwardly through the perforations of the plate on which it is supported, against said die which has been heated by heat deflected from the hotter end of the furnace, to substantially but not the same high temperature as said glass plate, said die having depressions in its bottom surface outlining and defining the raised letter to be produced in the glass plate, of then subjecting the raised letter glass plate while still on the same supporting plate, to successively decreasing temperatures, and of finally removing the glass plate from its supporting plate.

6. The process of making glass letter plates which consists in heating a furnace chamber to progressively increasing temperatures from one end to the other thereof, of advancing a plurality of flat, perforated supporting plates, each with a glass plate thereon, one after the other, through said furnace chamber from the cooler to the hotter end thereof, toward a die located outside and beyond said hotter end of the furnace chamber, so that each of said flat supporting plates and the associated glass plate thereon, is subjected to zones of heat of progressively increasing temperatures during their advance through said furnace chamber, from said cooler end toward said hotter end of the furnace, the rate of advance being such that the glass plate is gradually and finally heated at the hotter end of the furnace where such heat is maintained, as to bring said glass plate into a condition in which it is pliable and workable against a die, of then subjecting the advanced glass plate to pneumatic pressure exerted upwardly through the perforations of the supporting plate against said die, which has been heated by heat deflected from the hotter end of the furnace chamber, to substantially but not the same high temperature as said advanced glass plate, said die having depressions in its bottom surface outlining and defining the raised letter to be produced in the glass plate, of then removing the die from the glass plate, of then dislodging the glass plate, but not removing it, from its supporting plate to break any bond that may have formed between the two under the action of the die, of then subjecting the glass plate with its supporting plate, to successively decreasing temperatures and of finally removing the glass plate from its supporting plate and annealing it.

7. The process of making letter plates or the like of the kind described from glass blanks, which consists in placing the blank on a perforated supporting plate, in then gradually heating the blank and its supporting plate to a predetermined high temperature, in then subjecting the blank to pneumatic pressure exerted through the perforations in its supporting plate against a die of substantially the same temperature, which has been brought to sealing relation against the top face of the blank, the pneumatic pressure exerted being sufficient to force the blank to conform to the intaglio formation of a character contained in the face of said die, in then dislodging the blank from the supporting plate by pneumatic pressure exerted through the perforations therein, in thereafter gradually cooling the formed blank upon its supporting plate, and in then removing the blank from its supporting plate and finally annealing it and cooling it.

8. The process of making letter plates or the like, of the kind described from glass blanks, which consists in successively placing said blanks on perforated supporting plates, in then advancing the blanks through a furnace in which is maintained zones of heat successively increasing from the inlet end to the outlet end where is maintained a predetermined high temperature, in then removing the blanks on their supporting plates in succession from the furnace and subjecting each blank to pneumatic pressure exerted through the perforations in its supporting plate against a die of substantially the same temperature which has been brought to sealing relation against the top face of the blank, in then dislodging the blank from its supporting plate by pneumatic pressure exerted through the perforations therein, in then returning the blanks successively, after they have been acted upon by the die, through the zones of heat maintained in the furnace, in reverse order from that in which they were fed to the die, in then removing the blank from its supporting plate, finally annealing it and cooling it, and placing another blank upon the warm supporting plate and introducing it into the furnace to be treated as before.

9. An apparatus for making glass letter plates, comprising a furnace, a perforated carrier plate upon which a glass plate is adapted to be heated in the furnace, a table to support said plate located adjacent said furnace, said table and carrier plate being constructed to define an inclosed space between them when the plate is on the table, means for discharging air under pressure into said space, a die, a hood on said furnace to deflect the heat of said furnace onto said die, and means for bringing said die downwardly into engagement with the top surface of the glass plate, on said carrier plate.

10. An apparatus for making glass letter plates, comprising an elongated furnace, means for producing zones of heat therein of increasing degrees of temperature, a longitudinally extending track in said furnace, perforated carrier plates upon each of which a glass plate is adapted to be heated in the furnace, said carrier plates being adapted to be supported on said track, means for advancing said carrier plates through said furnace, a table located in line with said track at the hotter end of said furnace, said table and each carrier plate being constructed to define an inclosed space between them when the plate is on the table, means for discharging air under pressure into said space, a die adapted to be brought downwardly into engagement with the top surface of the glass plate on said carrier plate, and means for directing the heat from the furnace against said die.

11. An apparatus for making glass letter plates, comprising an elongated furnace, means for producing zones of heat therein of increasing degrees of temperature, upper and lower tracks extending longitudinally through said furnace, perforated carrier plates upon each of which a glass plate is adapted to be heated in the furnace, adapted to be supported upon and advanced on the tracks in said furnace, a table to support said carrier plate located adjacent the hotter end of said furnace, said table and each carrier plate being constructed to define an inclosed space between them when the plate is on the table, means for discharging air under pressure into said space, a die adapted to be brought downwardly into engagement with the top surface of the glass plate on said carrier plate, a hood for directing the heat from the hotter end of said furnace against the die, and means for tilting said table to discharge the carrier plate with the glass plate thereon upon the lower track in the furnace.

12. In an apparatus of the kind described, comprising a furnace having a heating chamber therein, means for heating said chamber, a forming table at one end of said furnace body, a die, vertically removable toward and away from said forming table, a hood on said furnace to deflect the heat of said furnace chamber onto said die, a glass plate carrier, means for moving said carrier and associated glass plate through said heating chamber onto said forming table, means on said table for centering said supporting plate with reference to said die, pressure actuated means connected to said forming table for producing raised characters in the glass plate on said carrier when said die is engaged with said glass plate, said table being constructed to deliver said carrier back into said heating chamber, and means for removing said carrier with the raised character glass plate thereon back through said heating chamber.

13. In an apparatus of the kind described, comprising a furnace body having an elongated heating chamber therein, means for heating said chamber, a forming table at one end of said furnace body, a die vertically movable toward and away from said table, a hood on said furnace to deflect the heat of the furnace chamber onto said die, a glass plate carrier, means for moving said carrier and associated glass plate through said heating chamber in a horizontal plane onto said forming table, means on said table for centering said supporting plate with reference to said die, pressure actuated means connected to said forming table for producing raised characters in the glass plate on said carrier when said die is engaged with said glass plate, said table being constructed to deliver said carrier back into said heating chamber into a horizontal plane below that of said first mentioned horizontal plane, and means for moving said carrier with the raised character glass plate thereon back through said heating chamber.

14. In an apparatus of the kind described, comprising a furnace body, having an elongated heating chamber therein, means for heating said chamber to gradually increasing temperatures throughout its length, a forming table at one end of said furnace body, a glass plate carrier, means for moving said carrier and associated glass plate through said chamber from the cooler to the warmer end thereof, onto the forming table, a die member having character grooves therein, on said forming table, a hood on said furnace to deflect the heat of said furnace chamber onto said die, means providing an engagement between said glass plate on said carrier and said die member, means for displacing that part of said glass plate in the plane of said character grooves, into said character grooves, means for delivering said carrier and the raised character glass plate thereon from said forming table back into the warmer end of said heating chamber, and means for moving said carrier and glass plate back through said heating chamber to the cooler end thereof.

15. In an apparatus of the kind described, comprising a furnace body having an elongated heating chamber therein, means for heating said chamber to gradually increasing temperatures throughout its length, a forming table at one end of said furnace body, a glass plate carrier, means for moving said carrier and associated glass plate through said chamber from the cooler to the warmer end thereof, onto the forming table, a die member having character grooves therein on said forming table, a hood on said furnace to deflect the heat of said furnace chamber onto said die, means providing an engagement between said glass plate and said die member, means for exerting a pneumatic pressure upon that part of said glass plate in the plane of said character grooves to displace a part of said glass plate into said character grooves, means for delivering said carrier and the raised character glass plate thereon from said forming table back into the warmer end of said chamber, and means for moving said carrier and glass plate back through said heating chamber to the cooler end thereof.

16. In an apparatus of the kind described, comprising a furnace body having an elongated heating chamber therein, means for heating said chamber to gradually increasing temperatures throughout its length, a forming table at the warmer end of said heating chamber, a die plate having character grooves therein on said forming table, a hood on said furnace to deflect the heat of said furnace chamber onto said die, a perforated glass carrier, means for moving said carrier and associated glass plate through said heating chamber from the cooler to the warmer end thereof, onto said forming table into a position in the vertical plane of said die member, means producing engagement between said die plate and glass plate on said forming table, means for admitting a pneumatic pressure to said perforated glass plate carrier to displace that part of the glass plate thereon in the plane of the character grooves in said die plate, into said character grooves, means for delivering said perforated glass plate carrier and glass plate thereon, from said forming table back into the warmer end of said heating chamber, and means for moving said carrier and glass plate back through said heating chamber to the cooler end thereof.

17. In an apparatus of the kind described, comprising a furnace body having an elongated heating chamber, means for heating said chamber to gradually increasing temperatures from one end to the other thereof, a forming table at the warmer end of said heating chamber, a movable die plate mounted on said forming table, a hood on said furnace to deflect the heat of the furnace chamber onto said die, said die having character defining grooves therein, a perforated glass plate carrier having bottom sealing flanges, means for moving said carrier through said heating chamber from the cooler to the warmer end thereof, onto said forming table, means for moving said die plate into engagement with the glass on said carrier plate, means for admitting pneumatic pressure through said forming table below said carrier plate to displace that part of the glass plate thereon, below the character grooves in said die plate, into said character grooves, means for delivering said carrier and the raised character glass plate thereon back into the heating chamber from said forming table, and means for moving said carrier and glass plate through said heating chamber to the cooler end thereof.

18. In an apparatus of the kind described, comprising a furnace body having an elongated heating chamber, means for heating said chamber to gradually increasing temperatures from one end to the other thereof, a forming table at the warmer end of said heating chamber, a movable die plate mounted on said forming table, a hood on said furnace to deflect the heat of the furnace chamber onto said die, said die having character defining grooves therein, a perforated glass plate carrier having bottom sealing flanges, means for moving said carrier through said heating chamber from the cooler to the warmer end thereof, onto said forming table, means on said forming table for centering and holding said glass plate carrier in vertical alinement with the said die plate, means for moving said die plate into sealing engagement with the glass plate on said carrier, means for admitting a pneumatic pressure through said table below said glass plate carrier to displace a part of said glass plate into the character grooves in said die member, means for delivering said carrier and glass plate back into said heating chamber, and means for moving said carrier back through said heating chamber to the cooler end thereof.

19. In an apparatus of the kind described, comprising a furnace body having an elongated heating chamber, means for heating said chamber to gradually increasing temperatures from one end to the other thereof, a forming table at the warmer end of said heating chamber, a movable die plate mounted on said forming table having character defining grooves therein, a hood on said furnace to deflect the heat of the furnace chamber onto said die, a perforated glass plate carrier having bottom sealing flanges, means for moving said carrier through said heating chamber from the cooler to the warmer end thereof, onto said forming table, means on said forming table for centering and holding said glass plate carrier in vertical alinement with the said die plate, means for moving said die plate into sealing engagement with the glass plate on said carrier, means on said die plate for gripping the edges of said glass plate, means for admitting a pneumatic pressure through said table below said glass plate carrier to displace a part of said glass plate into the character grooves in said die member, means for delivering said carrier and glass plate back into said heating chamber, and means for moving said carrier back through said heating chamber to the cooler end thereof.

20. In an apparatus of the kind described, a furnace body having an elongated heating chamber, means for heating said chamber to gradually increasing temperatures throughout its length, top and bottom rails in said heating chamber, a forming table at one end of said furnace body, a glass plate carrier adapted for movement on said rails, means for moving said carrier and glass plate through said chamber on the topmost rails from the cooler to the warmer end of said heating chamber, onto the forming table, a die member having character grooves therein on said forming table, means providing engagement between said glass plate and said die member, means for displacing that part of said glass plate in the plane of said character grooves of said die plate, into said character grooves, means for delivering said glass plate and carrier from said forming table back into the warmer end of said heating chamber and onto the bottom rails therein, and means for moving said glass plate and carrier on said bottom rails, back through said heating chamber to the cooler end thereof.

21. In an apparatus of the kind described, comprising a furnace body having an elongated heating chamber therein, means for heating said chamber to gradually increasing temperatures throughout its length, means providing top and bottom rails in said heating chamber, a forming table at the warmer end of said heating chamber, a die plate having character grooves therein on said forming table, a glass plate carrier adapted for movement on said rails, means for moving said carrier and its associated glass plate through said heating chamber on the topmost rails from the cooler to the warmer end thereof onto said forming table and into a position in the vertical plane of said die member, means producing engagement between said die plate and glass plate on said carrier, means for admitting a pneumatic pressure through said table beneath said glass plate carrier, to displace that part of the glass plate thereon in the plane of the character grooves of said die plate into said grooves, means for delivering said perforated glass plate carrier and glass plate thereon from said forming table onto the bottom rails in the warmer end of said heating chamber, and means for moving said carrier plate on said bottom rails through said heating chamber to the cooler end thereof.

22. In an apparatus of the kind described, comprising a furnace body having an elongated heating chamber, means for heating said chamber to gradually increasing temperatures from one end to the other thereof, top and bottom rails in said heating chamber, a tilting forming table at the warmer end of said heating chamber, a vertically movable die plate mounted on said forming table, having character defining grooves therein, a perforated glass plate carrier having bottom flanges, said glass plate carrier being capable of movement on said rails, means for moving said carrier and associated glass plate on the topmost rails through said heating chamber from the cooler to the warmer end thereof, onto said forming table, means for imparting a vertical movement to said die plate to bring the same into engagement with the glass on said carrier plate, means for admitting pneumatic pressure through said forming table below said carrier plate to displace that part of the glass thereon below the character grooves in said die plate into said character grooves, means for tilting said forming table so that one edge thereof is approximately in the plane of the bottom-most rails therein, and means for moving said glass plate carrier through said heating chamber to the cooler end thereof.

23. In an apparatus of the kind described comprising a furnace body having an elongated heating chamber, means for heating said chamber to gradually increasing temperatures from one end to the other thereof, top and bottom rails in said heating chamber, a tilting table at the warmer end of said heating chamber, upright standards on said tilting table, a die plate vertically movable on said standards, said die plate having character defining grooves therein, means for raising and lowering said die plate away from and toward said table, a perforated glass plate carrier adapted for movement on said rails, means for moving said carrier on the topmost rails through said heating chamber from the cooler to the warmer end thereof, onto said tilting table, means on said tilting table for centering said glass plate carrier in vertical alinement with said die plate, means actuated in the downward movement of said die plate for engaging said glass plate, means for admitting pneumatic pressure to said table below said glass plate carrier to displace a part of said glass plate into the character grooves in said die plate, means for tilting said table, means for delivering said glass plate, after said table has been tilted, onto the bottom-most rails in said heating chamber, and means for moving said carrier on said bottom rails back through said heating chamber to the cooler end thereof.

In testimony, that I claim the foregoing as my invention, I affix my signature in the presence of two witnesses, this 19th day of February, A. D. 1918.

ADOLPH W. GAST.

Witnesses:
  D. DARRENOUGUÉ,
  T. H. ALFREDS.